(12) United States Patent
Jakob et al.

(10) Patent No.: US 6,522,257 B1
(45) Date of Patent: Feb. 18, 2003

(54) DEVICE FOR RECOGNITION OF A CHILD-RESTRAINT SEAT ATTACHED TO A VEHICLE SEAT

(75) Inventors: Gert Jakob, Stuttgart (DE); Werner Nitschke, Ditzingen (DE); Arno Schaumann, Ludwigsburg (DE); Gerd Bohmwetsch, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,968
(22) PCT Filed: Feb. 16, 1999
(86) PCT No.: PCT/DE99/00426
§ 371 (c)(1),
(2), (4) Date: Feb. 14, 2001
(87) PCT Pub. No.: WO99/65729
PCT Pub. Date: Dec. 23, 1999

(30) Foreign Application Priority Data

Jun. 18, 1998 (DE) .......................... 198 27 057

(51) Int. Cl.[7] .................................. G08B 21/00
(52) U.S. Cl. ................ 340/686.1; 340/667; 340/686.4; 200/61.58 B; 200/85 A
(58) Field of Search ........................ 340/686.1, 687, 340/644, 542, 487, 594, 686.4, 666, 667; 200/61.58 B, 85 A; 180/273

(56) References Cited

U.S. PATENT DOCUMENTS

| 4,000,385 | A | * | 12/1976 | Colasanti | 200/241 |
| 4,608,469 | A | * | 8/1986 | Doty | 200/275 |
| 5,060,977 | A | * | 10/1991 | Saito | 200/61.45 M |
| 5,605,348 | A | | 2/1997 | Blackburn et al. | 280/735 |
| 6,007,093 | A | * | 12/1999 | Bechtle et al. | 280/735 |

FOREIGN PATENT DOCUMENTS

| DE | 44 26 677 | 2/1995 |
| DE | 44 09 971 | 9/1995 |
| EP | 0 603 733 | 6/1994 |
| WO | 97 19835 | 6/1997 |

* cited by examiner

Primary Examiner—Daniel J. Wu
Assistant Examiner—Son Tang
(74) Attorney, Agent, or Firm—Kenyon & Kenyon

(57) ABSTRACT

A very reliable device, which can be implemented at a low cost, has a switch mechanism arranged on a fastening device which is installed on a vehicle seat and can engage with a plug element on a child seat; The switch mechanism has a stationary part attached to the fastening, device and a movable part, which is moved by the plug element into the stationary part on mutual engagement of the plug element with the fastenings device, thereby activating a switch so that occupancy of the vehicle seat by a child seat is signaled.

6 Claims, 8 Drawing Sheets

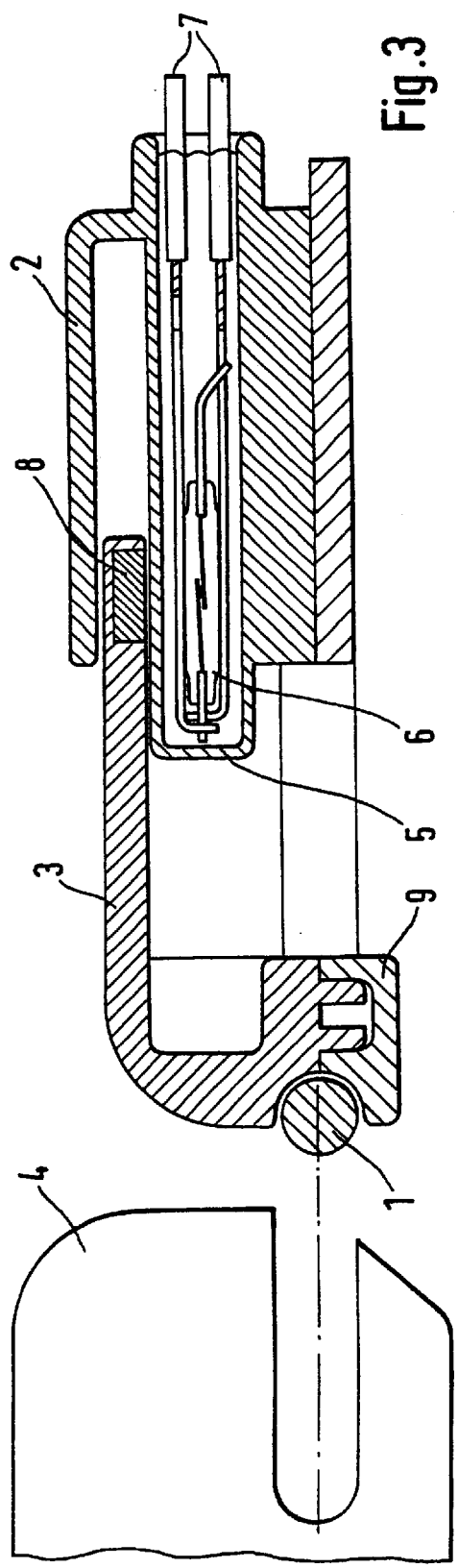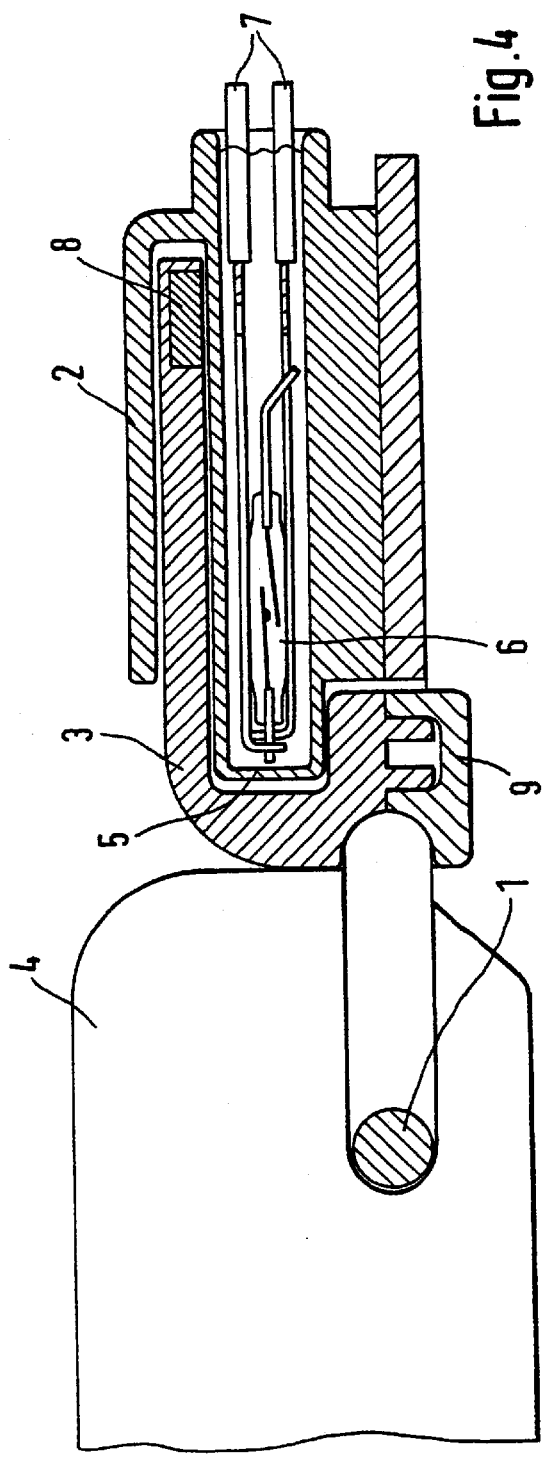

DEVICE FOR RECOGNITION OF A CHILD-RESTRAINT SEAT ATTACHED TO A VEHICLE SEAT

FIELD OF THE INVENTION

The present invention relates to a device for detecting a child seat attached to a vehicle seat.

BACKGROUND INFORMATION

Studies by (NHTSA) the National Highway Traffic Safety Administration in the United States, for example, have shown that deployment of an airbag when a child is restrained in a child seat attached to an automotive seat can cause serious injuries. Deployment of one or more airbags belonging to a vehicle seat with a child seat attached to it should therefore be suppressed in any case. Thus, a controller provided in the vehicle to control deployment of the airbags must receive a signal to indicate when a child seat is on a passenger seat so that the airbags assigned to this seat will not be deployed in the event of an accident. There are conventional devices that detect a child seat on a vehicle seat and signal this condition to the controller.

For example, German Patent No. 44 09 971 ; German Utility Model No. 296 19 668 U1 and U.S. Pat. No. 5,605,348 describe child seat detection devices that operate according to the transponder principle, where an identification carrier, which in the simplest case is an electromagnetic tuned circuit, is provided on the child seat, and a transmission element emitting an electromagnetic alternating field is provided in the vehicle seat. A receiver element in the vehicle seat records the change in field caused by the interaction between the identification carrier on the child seat and the electromagnetic field emitted by the transmitting element. However, such a child seat detection based on the transponder principle is extremely complicated and expensive.

German Patent Application No. 44 26 677 describes a device for attaching a child seat to a vehicle seat. This device has a belt lock housing that is attached to the vehicle so that a plug element on the child seat can be locked into it. The belt lock housing contains a switch mechanism that has a movable part, which is inserted on engagement of the plug element in the belt lock housing, thereby closing a contact that sends a signal to an airbag controller indicating that deployment of the airbag must be suppressed because of the child seat.

An object of the present invention is to provide a device for detection of a child seat attached to a vehicle seat that can be implemented at the lowest possible expense and yet detects with a very high reliability a child seat attached to a vehicle seat.

The object described above is achieved due to the fact that fastening means, which are installed on a vehicle seat and can be engaged with a plug element on the child seat, is provided with a switch mechanism. The switch mechanism has a stationary part attached to the fastening means and has a movable part, which is moved by the plug element into the stationary part on mutual engagement of the plug element with the fastening means, thereby activating a switch which signals that the passenger seat is occupied by a child seat.

The switch, for example, is a reed switch. In addition, there is a magnet that alters the position of the reed switch on displacement of the movable part into the stationary part. Such a switch mechanism can be installed very easily and detects reliably whether a child seat has been attached to a vehicle seat. In addition, this switch mechanism is designed to be very space saving.

The switch is arranged, for example, in the stationary part of the switch mechanism, and the magnet is arranged, for example, in the movable part. The magnet is directly above the reed switch and closes/opens it when the movable part is in its starting position where it has not be affected by the plug element. The magnet is located a distance away from the switch and opens/closes it when the movable part has been displaced by the plug element.

The movable part may be, for example, a slide that is pushed by the plug element into the stationary part on mutual engagement of the plug element with the fastening means. A compression spring used in the stationary part keeps the slide in its starting position when the plug element has not been engaged.

The movable part may also be a lever that is pivotably mounted in the stationary part and flipped by the plug element into the stationary part on mutual engagement of the plug element with the fastening means. A tension spring inserted into the stationary part holds the lever in its starting position when the plug element has not been engaged.

BRIEF DESCRIPTION OF THE DRAWINGS

FIG. 3 shows a longitudinal cross section A—A through the first switch mechanism before engaging a plug element.

FIG. 4 shows a longitudinal cross section A—A through the first switch mechanism with the plug element engaged.

DETAILED DESCRIPTION

Figure 1A:
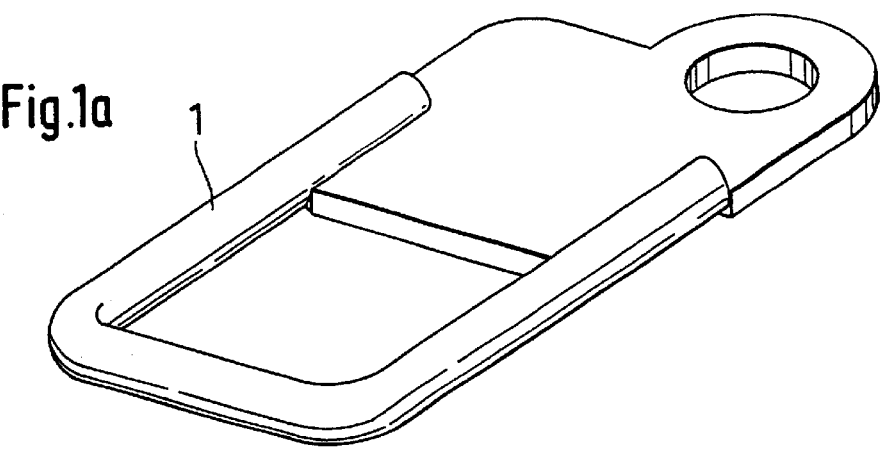
FIG. 1a shows a fastening clamp for a child seat.
Figure 1B:
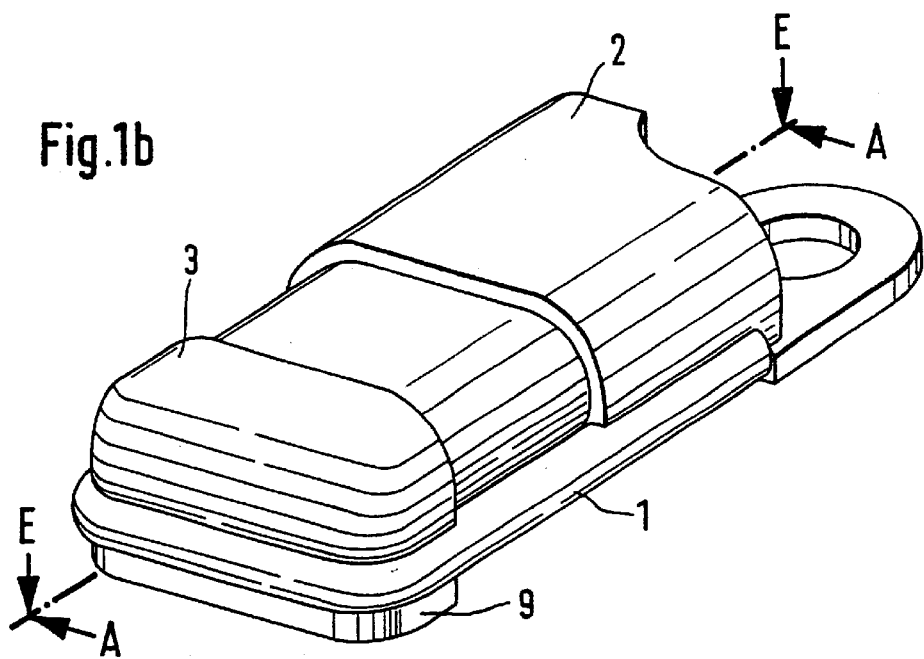
FIG. 1b shows a first switch mechanism secured on a fastening clamp that has a slide in a starting position.
Figure 2:
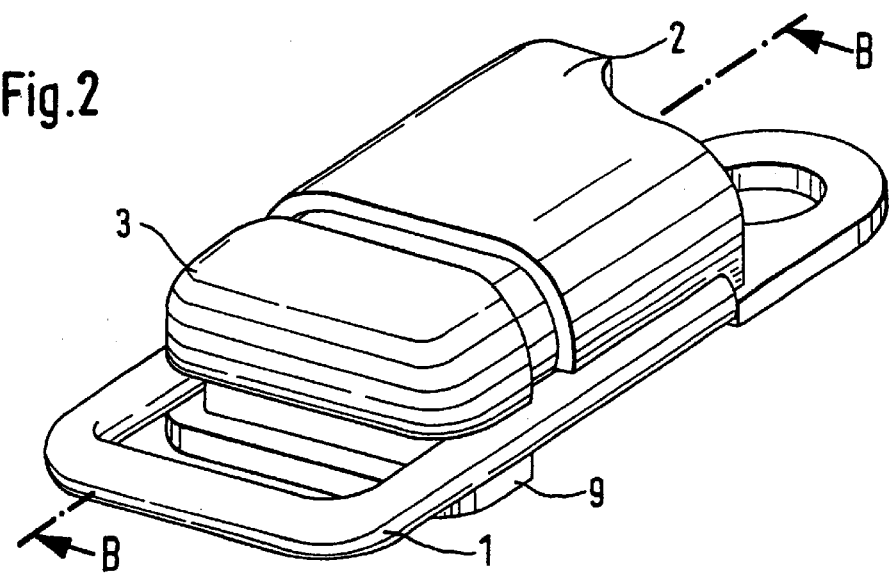
FIG. 2 shows the first switch mechanism with a slide inserted.

FIG. 1a, 1b and 2 show perspective diagrams of a device for detecting a child seat attached to a motor vehicle seat.

FIG. 1a shows a fastening means 1 in the form of a clamp (hereinafter referred to as a fastening clamp), which is installed on a vehicle seat, usually the passenger seat. A plug element provided on a child seat can be engaged with this fastening clamp 1 to attach the child seat to the vehicle seat. To be able to determine whether fastening clamp 1 has been engaged with the plug element of a child seat, there is a switch mechanism (shown in perspective view in FIG. 1b)

composed of a stationary part 2 attached to fastening clamp 1 and a movable part 3. In this first embodiment of the switch mechanism, movable part 3 is composed of a slide that is pushed into the stationary part when the plug element on the child seat engages with fastening clamp 1. The perspective diagram in FIG. 2 shows a switch mechanism where slide 3 has been pushed into stationary part 2.

To illustrate the functioning of the switch mechanism in greater detail, several longitudinal sections and cross sections are shown in FIGS. 3 through 7. FIG. 3 shows a longitudinal cross section A—A through the first switch mechanism illustrated in FIG. 1b with a slide 3 in its starting position, which it assumes when plug element 4 of the child seat is not engaged with fastening clamp 1. Stationary part 2 of the switch mechanism has a receptacle space for a reed switch 6 designed, for example as a tube 5. Terminals 7 of reed switch 6 lead out of stationary part 2 to a controller (not shown), which controls the deployment of airbags in the vehicle. Slide 3 slides along tube 5. A permanent magnet 8 is embedded in the wall above tube 5. Magnet 8 is directly above reed switch 6 in the starting position of slide 3, i.e., when plug element 4 is not engaged with fastening clamp 1, as shown in FIG. 3. Depending on how the reed switch is designed, it is opened or closed by the field of magnet 8. In the embodiment illustrated here, reed switch 6 is closed.

FIG. 4 shows a longitudinal cross section B—B through the switch mechanism illustrated in FIG. 2 in a state where slide 3 has been pushed into stationary part 2 by plug element 4, which is engaged with fastening clamp 1. In this position of slide 3, magnet 8 is a distance away from reed switch 6, so that reed switch 6 opens or closes according to its design. In the embodiment illustrated in FIG. 4, the moving away of the magnet leads to opening of reed switch 6. Engagement of plug element 4 on the child seat with fastening clamp 1 on the vehicle seat thus leads to a change in the switch position which is registered by the controller for airbag deployment as the presence of a child seat on the vehicle seat.

A molded part 9 is screwed onto the bottom side of slide 3, partially enclosing the fastening clamp and functioning as a sliding aid for slide 3.

Figure 5:
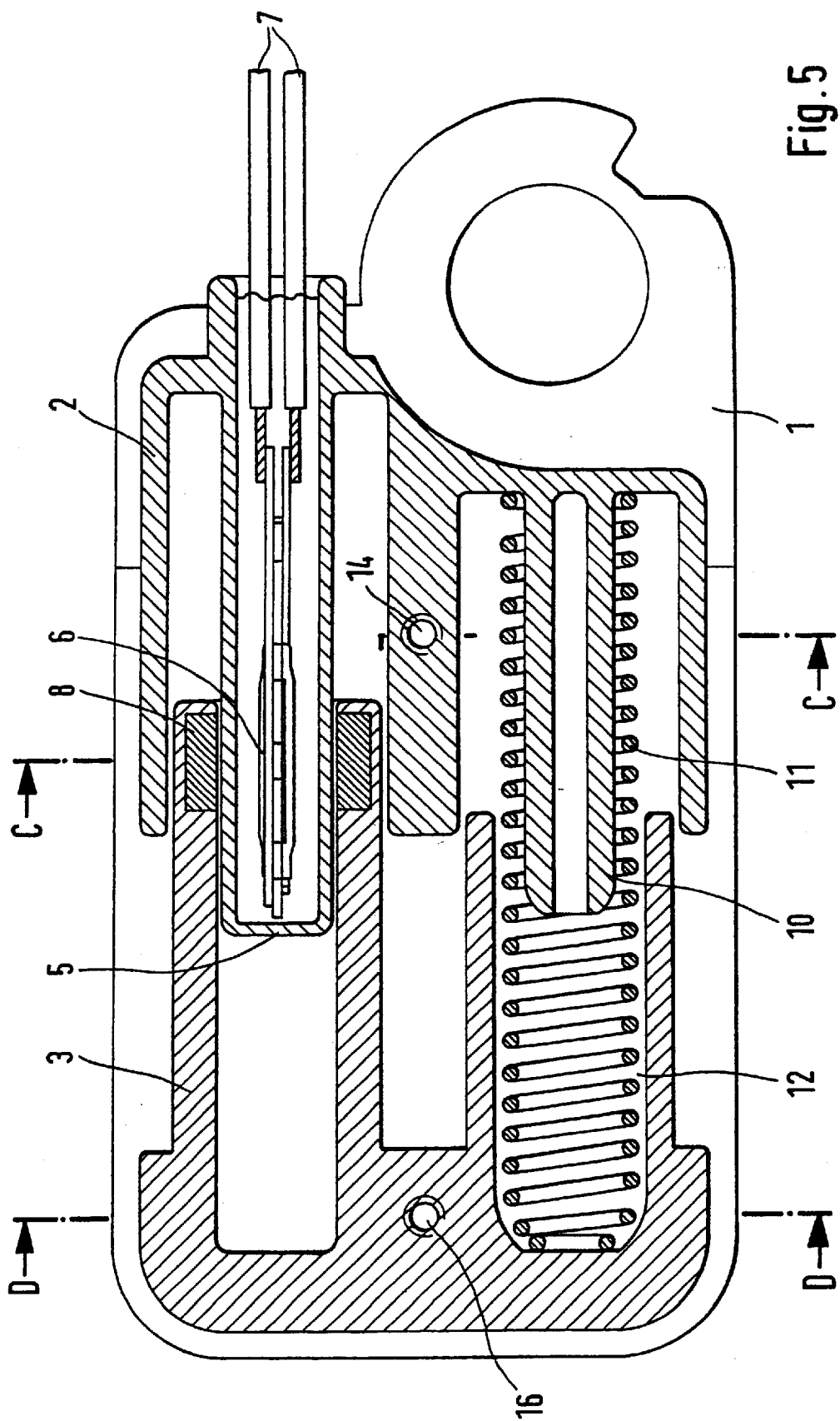
FIG. 5 shows a cross section E—E through the first switch mechanism perpendicular to cross section A—A.
Figure 6:
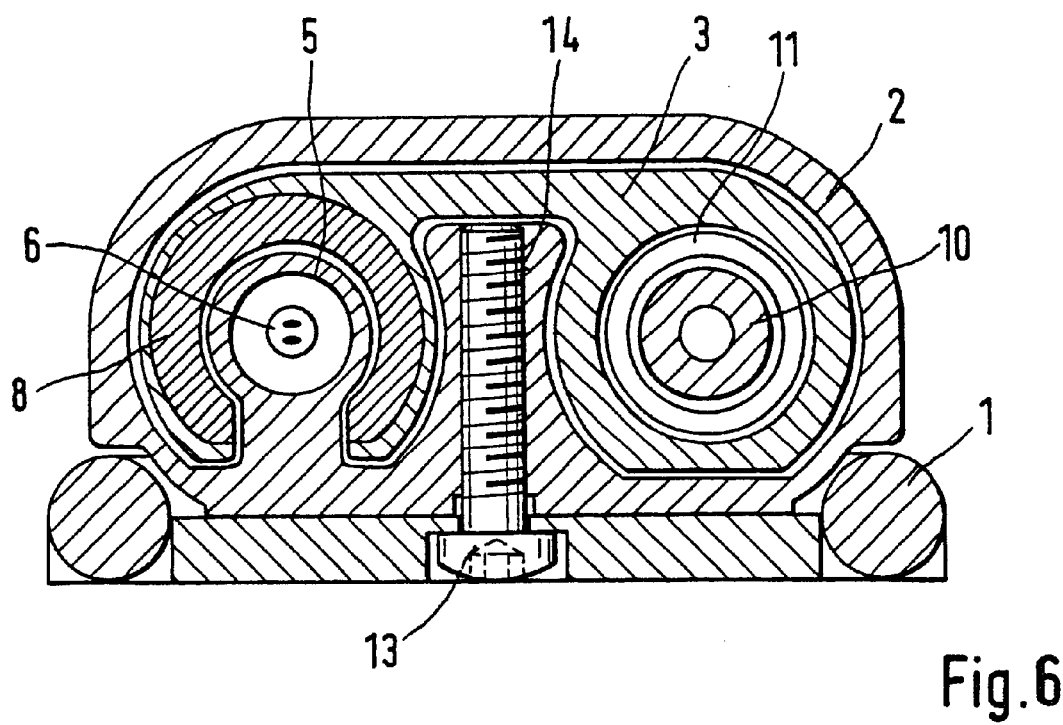
FIG. 6 shows a cross section C—C through the first switch mechanism.

FIG. 5 shows another longitudinal cross section E—E perpendicular to longitudinal cross section A—A through the switch mechanism. This view shows that a compression spring 11 sits in stationary part 2 on a journal 10, projecting into a recess 12 in slide 3 and ensuring that slide 3 will be held in its starting position if a plug element 4 is not pressing slide 3 against compression spring 11 into stationary part 2.

A cross section C—C through stationary part 2 shown in FIG. 6 illustrates again the arrangement of compression spring 11 on journal 10 and magnet 8 which almost completely surrounds tube 5 in which reed switch 6 is located. The cross-sectional diagram in FIG. 6 also illustrates the screw connection of fastening clamp 1 to stationary part 2 with the aid of a screw 13 which is tightened into a threaded hole 14 in stationary part 2.

Figure 7:
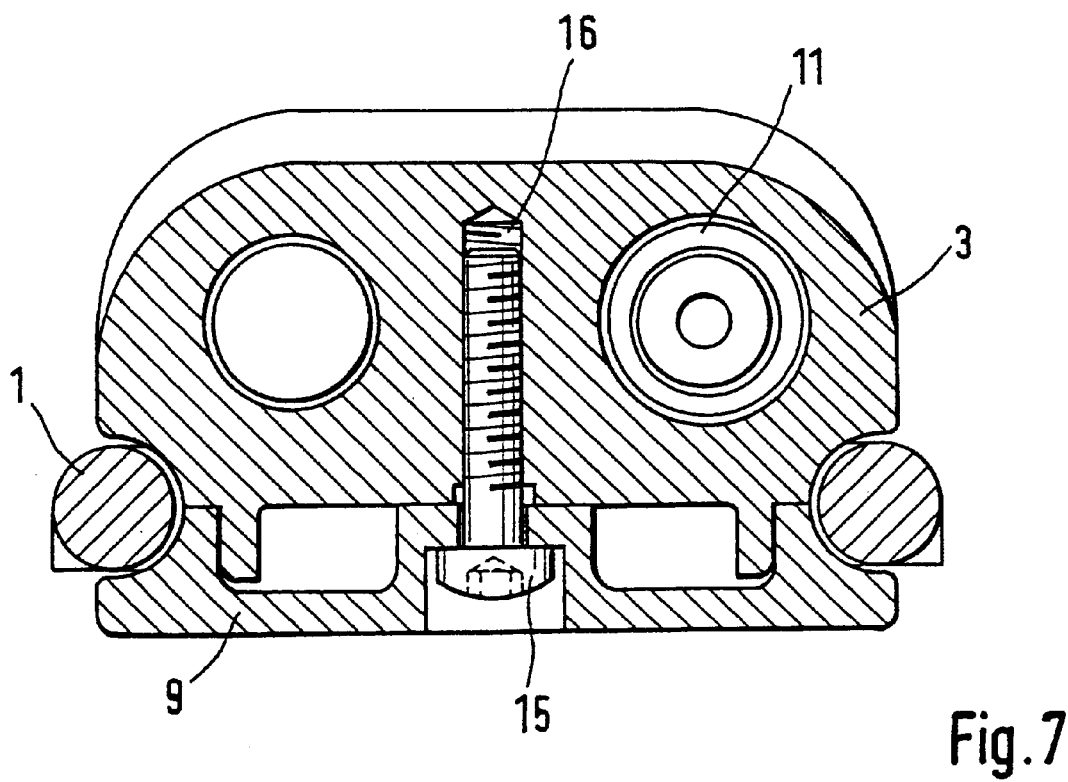
FIG. 7 shows a cross section D—D through the first switch mechanism.

A cross section D—D through slide 3 illustrated in FIG. 7 shows that molded part 9 is connected to slide 3 with the aid of a screw 15 which is tightened into a threaded hole 16 in slide 3.

FIGS. 8 through 13 illustrate a second embodiment of a switch mechanism.

Figure 8:
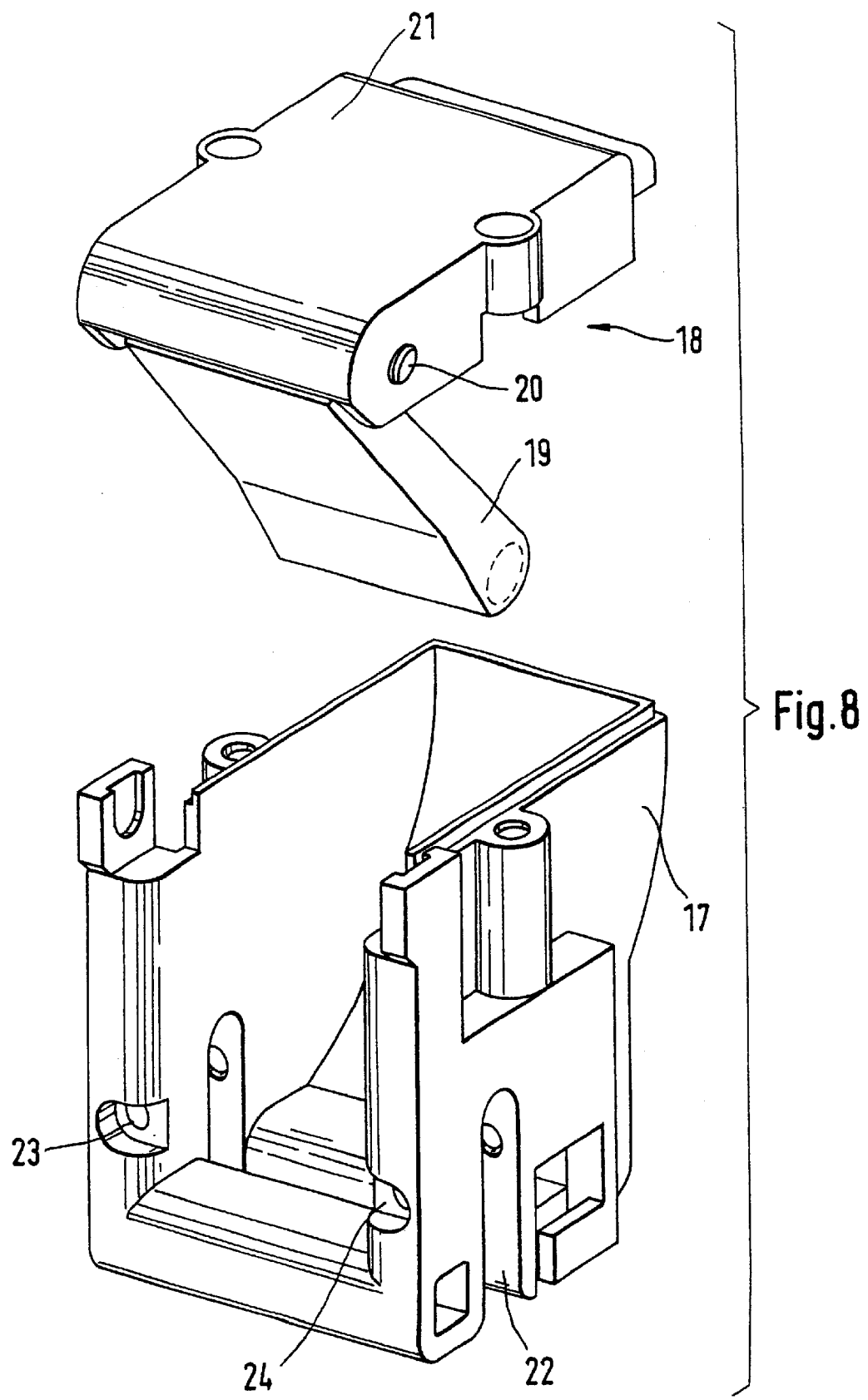
FIG. 8 shows a three dimensional diagram of a second switch mechanism.

FIG. 8 shows a perspective view of the switch mechanism composed of a stationary part 17 and a movable part 18. The two parts 17 and 18 are shown separately in FIG. 8 to illustrate that movable part 18 is composed essentially of a lever 19, which is mounted so it can pivot about an axis 20 on a cover 21 that can be screwed onto stationary part 17.

Figure 9:
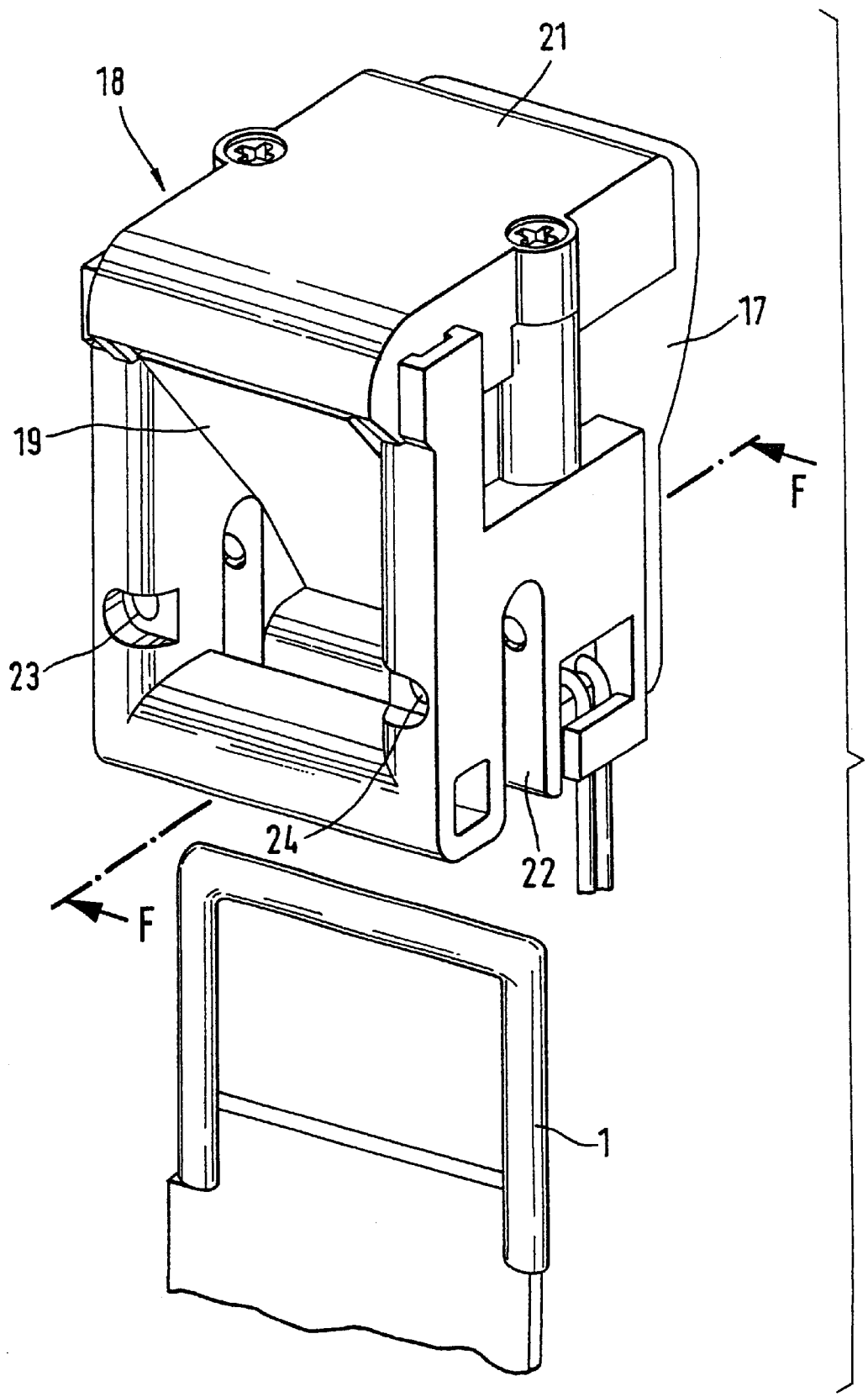
FIG. 9 shows the second switch mechanism in an assembled form.

FIG. 9 shows a view of the switch mechanism, where movable part 18 is screwed onto stationary part 17. A slot 22 is provided on the side of housing 17 opposite cover 21 so that fastening clamp 1 of the vehicle seat can be inserted into stationary part 17. Screw holes 23 and 24 running perpendicular to slot 22 indicate that fastening clamp 1 is screwed into slot 22.

The front side of stationary part 17 facing outward from the plane of projection is open so that plug element 4 of the child seat can be inserted through it and engaged with fastening clamp 1. This procedure is illustrated in FIGS. 10 and 11 by longitudinal cross section F—F through parts 17 and 18.

Figure 10:
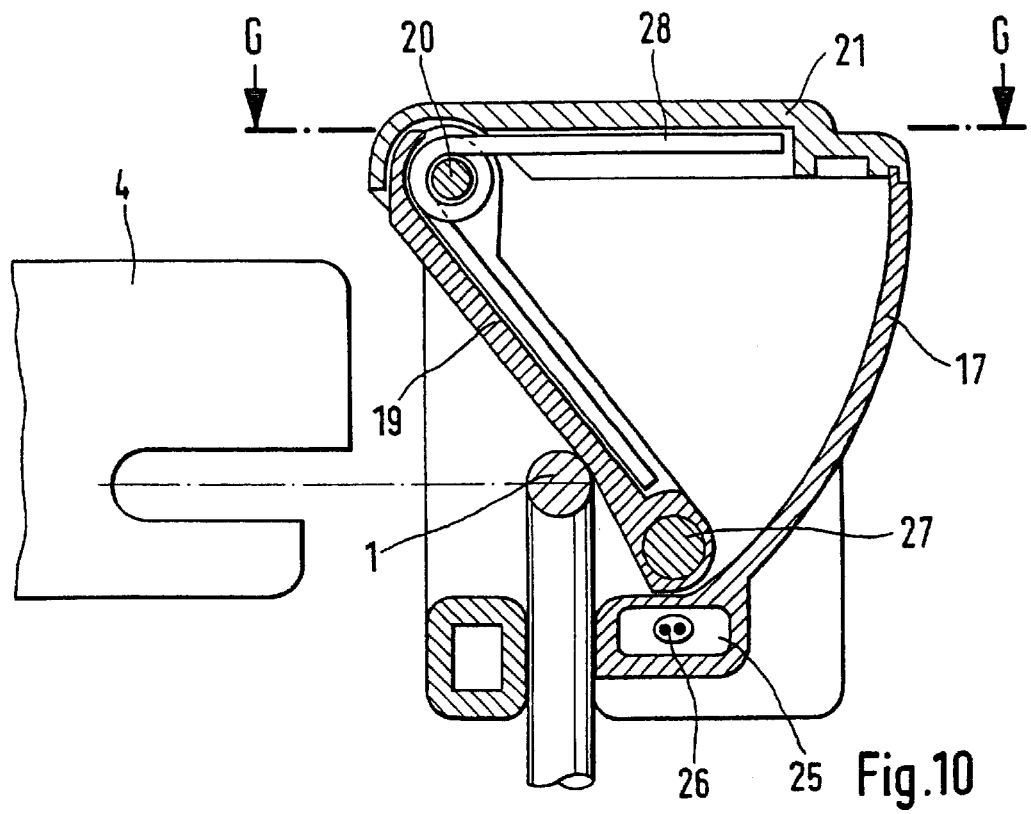
FIG. 10 shows a longitudinal cross section F—F through the second switch mechanism before engaging a plug element.

FIG. 10 shows that a chamber 25 is provided in the bottom of stationary part 17 to accommodate a reed switch 26. Lever 19 can be pivoted about an axis 20 on cover 21 on the side of stationary part 17 opposite chamber 25. Lever 19 has a magnet 27 on the end opposite pivot axis 20. FIG. 10 shows the starting position of lever 19, where plug element 4 is not inserted into stationary part 17 to engage with fastening clamp 1. In this starting position of lever 19, its magnet 27 is directly above reed switch 26. Depending on the design of the reed switch, the magnetic field of magnet 27 causes the switch to either open or close.

Figure 11:
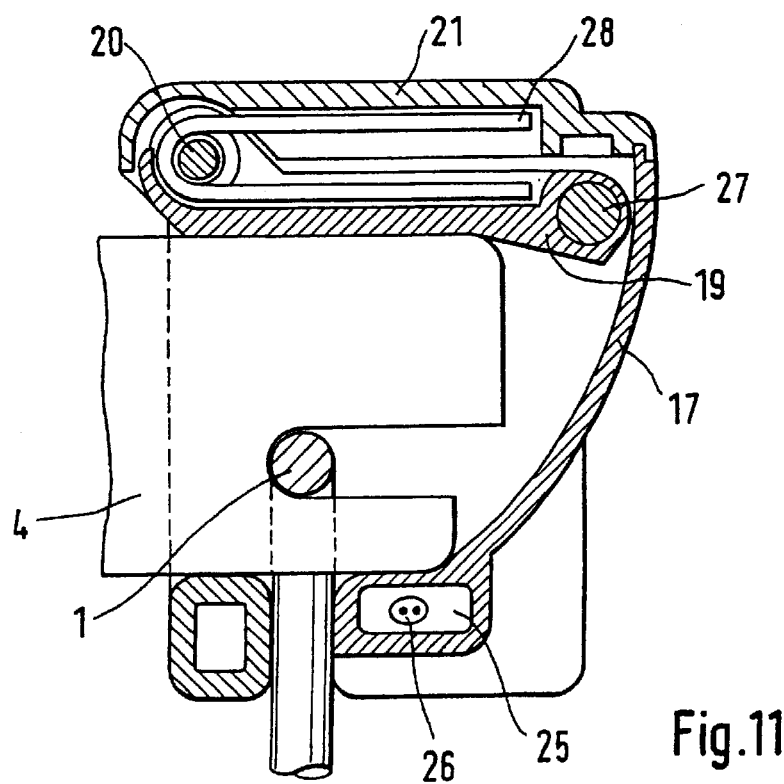
FIG. 11 shows a longitudinal section F—F through the second switch mechanism with a plug element engaged.

When plug element 4 is pushed into stationary part 17 as illustrated in FIG. 11, lever 19 is pivoted upward, causing magnet 27 to move away from reed switch 26. This produces a change in the switch status of the reed switch from closed to open or vice versa, which is a signal for the controller to suppress deployment of the airbags provided for that vehicle seat.

Figure 12:
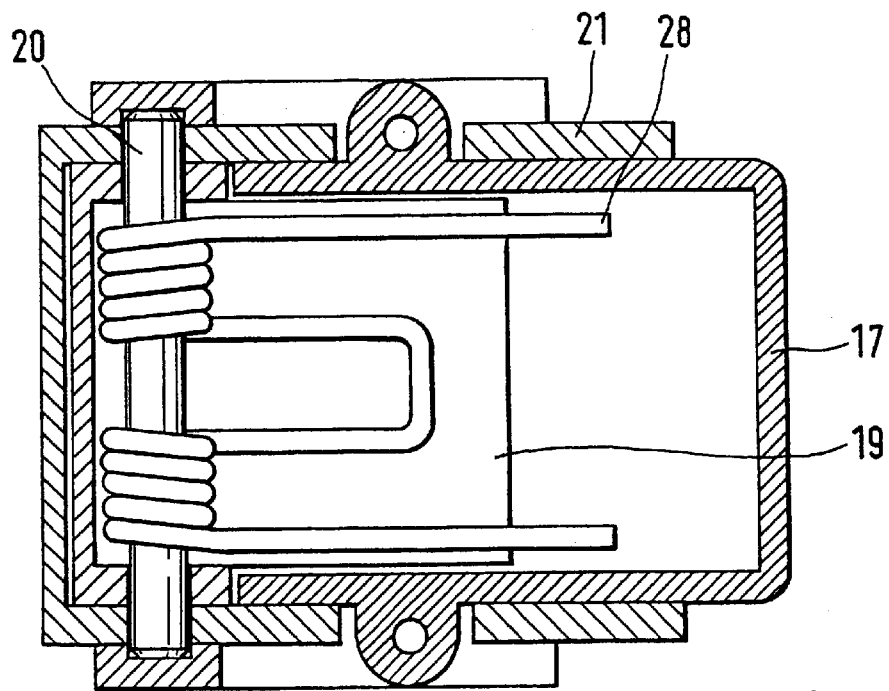
FIG. 12 shows a longitudinal section G—G through the second switch mechanism.
Figure 13:
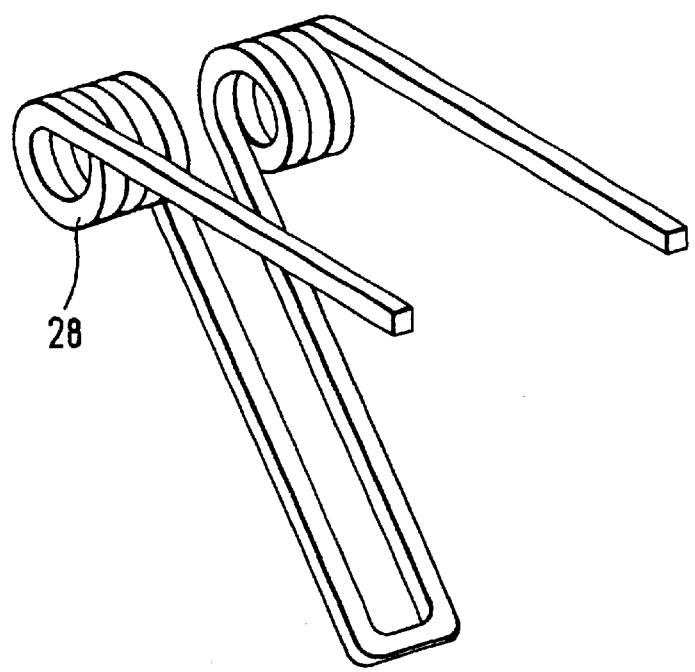
FIG. 13 shows a tension spring.

FIG. 12 shows a longitudinal cross section G—G at the height of cover 21 through the switch mechanism. This shows that a tension spring 28 such as that illustrated in FIG. 13 has been inserted into stationary part 17. This tension spring 28 causes pivotable lever 19 to be retained in its starting position, i.e., the end of the lever is pressed against the bottom above chamber 25 of the stationary part (see FIG. 10).

What is claimed is:

1. A device for detecting a child seat attached to a vehicle seat, comprising:
   a fastening device installed in the vehicle and configured to engage with a plug element on the child seat;
   a switch mechanism arranged on the fastening device, the switch mechanism having a stationary part and a movable part, the stationary part being attached to the fastening device, the movable part being displaced by the plug element into the stationary part upon mutual engagement of the plug element with the fastening device;
   a reed switch activated by a displacement of the movable part into the stationary part, an activation of the switch signaling that the vehicle seat is occupied by the child seat; and
   a magnet for changing a position of the reed switch when there is a displacement of the movable part into the stationary part.

2. The device according to claim 1, wherein:
   the reed switch is arranged in the stationary part and the magnet is arranged in the movable part;
   the magnet is directly above the reed switch and one of opens and closes the reed switch when the movable part is in a starting position, the starting position being a position of the movable part when the movable part has not been displaced by the plug element; and the magnet is at a distance from the reed switch and one of opens and closes the reed switch when the movable part has been displaced by the plug element.

3. The device according to claim 2, wherein:

the movable part includes a slide, the slide being pushed by the plug element into the stationary part upon mutual engagement of the plug element with the fastening device.

4. The device according to claim 3, further comprising:

a compression spring inserted into the stationary part, the compression spring retaining the starting position when the plug element is not engaged with the fastening device.

5. The device according to claim 1, wherein:

the movable part includes a pivotably mounted lever arranged in the stationary part, the pivotably mounted lever being flipped by the plug element into the stationary part upon mutual engagement of the plug element with the fastening device.

6. The device according to claim 5, further comprising:

a tension spring inserted into the stationary part, the tension spring retaining the pivotably mounted lever in the starting position when the plug element is not engaged with the fastening device.

* * * * *

UNITED STATES PATENT AND TRADEMARK OFFICE
CERTIFICATE OF CORRECTION

PATENT NO.    : 6,522,257 B1
DATED         : February 18, 2003
INVENTOR(S)   : Gert Jakob et al.

It is certified that error appears in the above-identified patent and that said Letters Patent is hereby corrected as shown below:

Column 1,
Line 11, delete "(NHTSA)".
Line 12, after "Administration", insert -- (NHTSA) --.
Before line 48, insert -- SUMMARY --.

Signed and Sealed this

Twenty-third Day of December, 2003

JAMES E. ROGAN
*Director of the United States Patent and Trademark Office*